Dec. 12, 1933.  L. F. NENNINGER  1,938,779
TRANSMISSION AND CONTROL MECHANISM FOR A MILLING MACHINE
Filed Dec. 1, 1930   7 Sheets-Sheet 1

Inventor
LESTER F. NENNINGER
By A. H. Parsons
Attorney

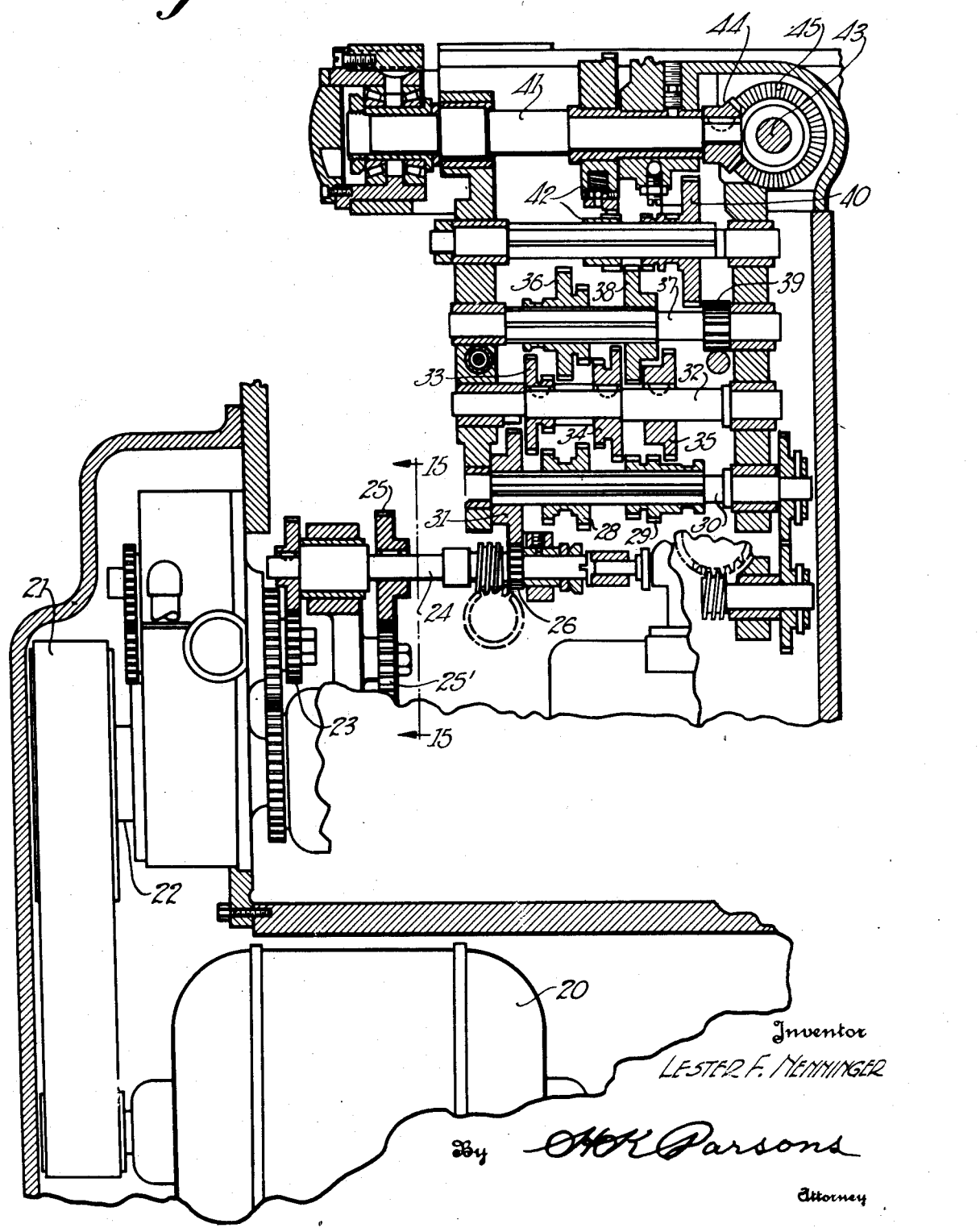

Dec. 12, 1933.  L. F. NENNINGER  1,938,779
TRANSMISSION AND CONTROL MECHANISM FOR A MILLING MACHINE
Filed Dec. 1, 1930  7 Sheets-Sheet 3

Inventor
LESTER F. NENNINGER
By AHParsons
Attorney

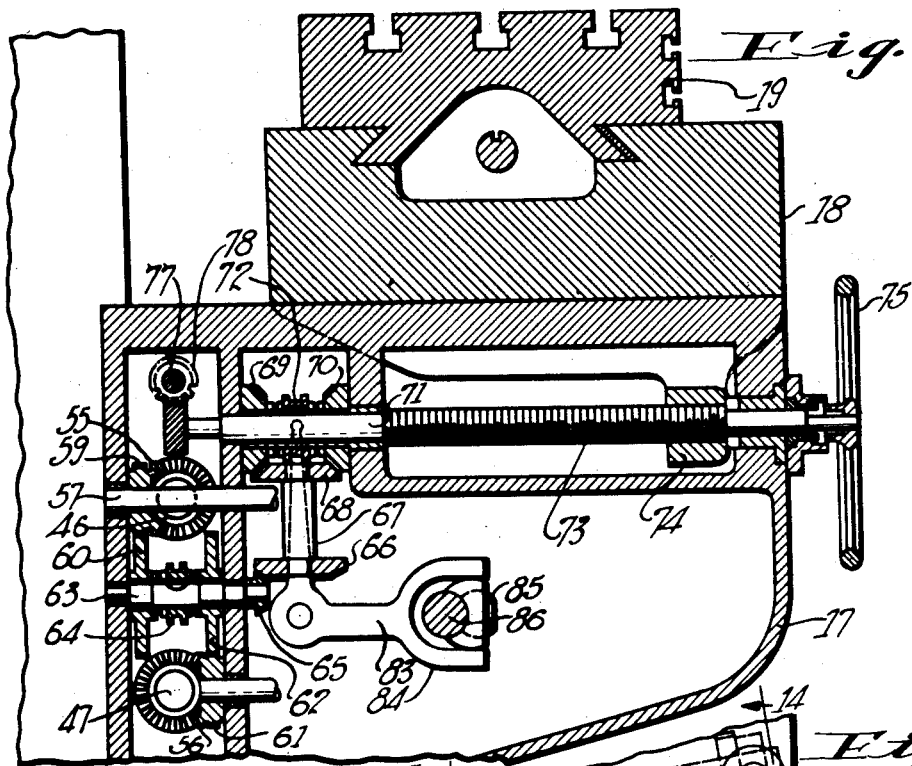
Fig. 5
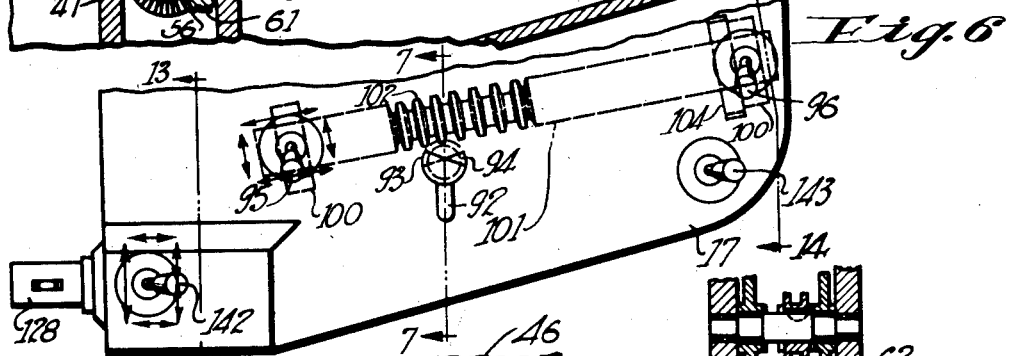
Fig. 6
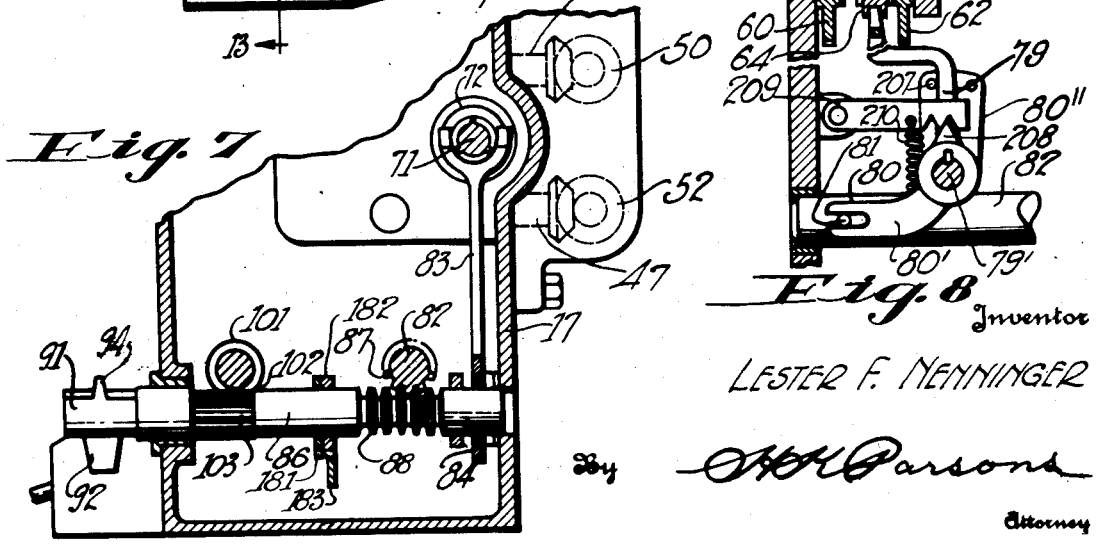
Fig. 7
Fig. 8
Inventor
LESTER F. NENNINGER
By AHHParsons
Attorney

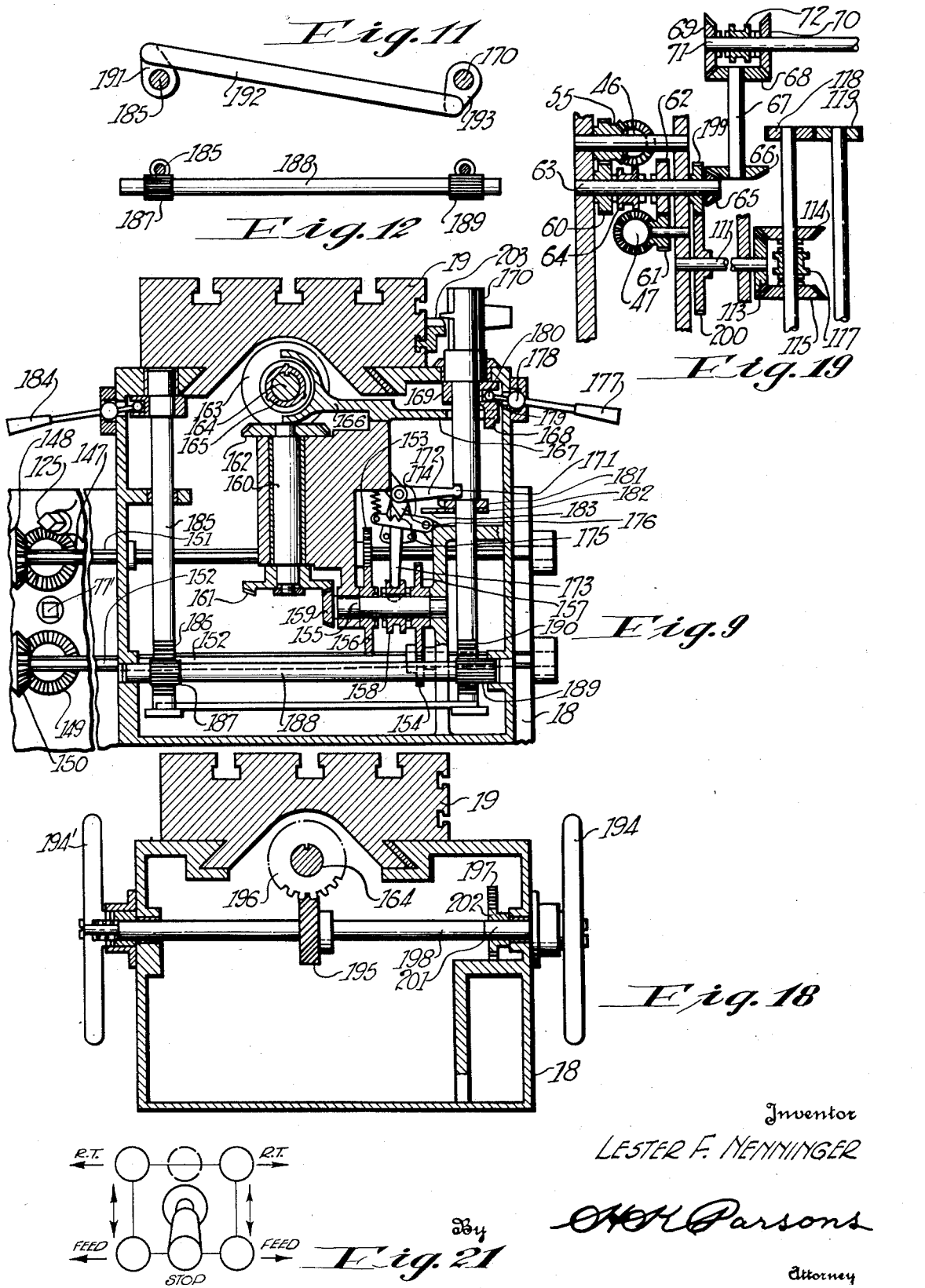

Dec. 12, 1933.  L. F. NENNINGER  1,938,779
TRANSMISSION AND CONTROL MECHANISM FOR A MILLING MACHINE
Filed Dec. 1, 1930  7 Sheets-Sheet 6
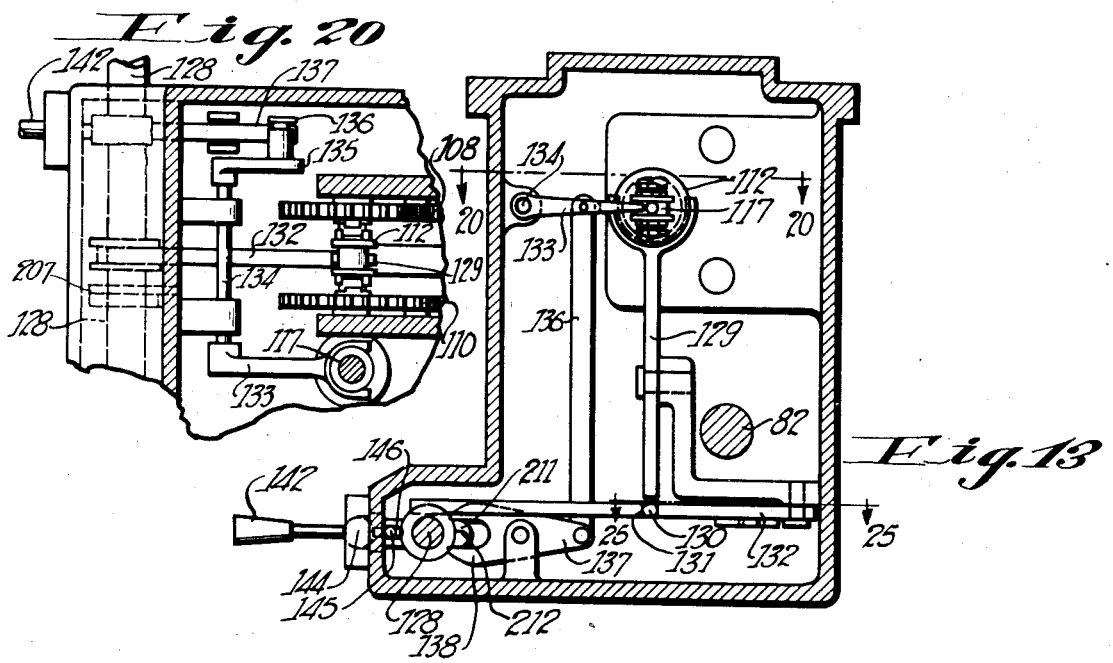
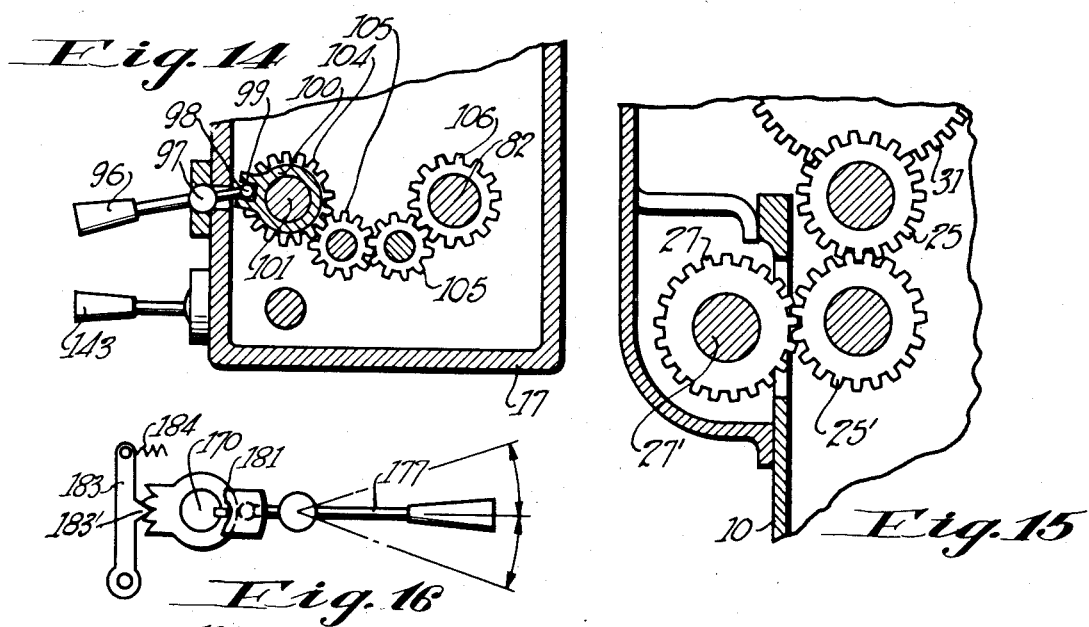
Inventor
LESTER F. NENNINGER
By A. K. Parsons
Attorney Dec. 12, 1933.  L. F. NENNINGER  1,938,779
TRANSMISSION AND CONTROL MECHANISM FOR A MILLING MACHINE
Filed Dec. 1, 1930    7 Sheets-Sheet 7

Inventor
LESTER F. NENNINGER
By A. H. Parsons
Attorney

Patented Dec. 12, 1933

1,938,779

UNITED STATES PATENT OFFICE 1,938,779

TRANSMISSION AND CONTROL MECHANISM FOR A MILLING MACHINE

Lester F. Nenninger, Cincinnati, Ohio, assignor to The Cincinnati Milling Machine Company, Cincinnati, Ohio, a corporation of Ohio Application December 1, 1930. Serial No. 499,200

15 Claims. (Cl. 90—21)

This invention relates to machine tools and more particularly to an improved transmission and control mechanism for milling machines.

One of the objects of this invention is to provide an improved transmission and control mechanism for a milling machine having a plurality of movable supports whereby each movable support may be separately controlled for rate and direction from a single individual control means.

Another object of this invention is the provision in a milling machine having three movable supports, of an individual trip actuated rate and direction control means for each support whereby any support may be cyclically actuated and during said actuation may be automatically controlled both as to rate and direction.

A further object of this invention is the provision in a milling machine having three movable slides of improved control mechanism whereby the power actuation of each slide at various rates and in different directions may be determined from different operating stations by means of a single rate and direction determinator for each support located at each station.

An additional object of this invention is the provision in a milling machine having a plurality of movable elements supported one by another in arithmetical progression, of an improved transmission for imparting movement to the various elements at rates which decrease in arithmetical progression as the number of supported elements increases.

Other objects and advantages of the present invention should be readily apparent by reference to the following specification considered in conjunction with the accompanying drawings illustrative of one embodiment thereof, but it will be understood that any modifications may be made in the specific structural details hereinafter disclosed, within the scope of the appended claims, without departing from or exceeding the spirit of the invention.

Referring to the drawings in which like reference numerals indicate like parts:

Figure 2 is an expanded view of the feed and rapid traverse transmission in the column of the machine.

Figure 5 is a section on the line 5—5 of Figure 3 showing an expanded view of the transmission to the saddle.

Figure 6 is a detail showing the saddle controls on the side of the knee.

Figure 7 is a section on the line 7—7 of Figure 6.

Figure 8 is a detail of the saddle rate clutch control.

Figure 9 is a section on the line 9—9 of Figure 3.

Figures 11 and 12 are details of the connectors between the front and rear table control plungers.

Figure 13 is a sectional view on the line 13—13 of Figure 6.

Figure 14 is a sectional view on the line 14—14 of Figure 6.

Figure 15 is a detail section on the line 15—15 of Figure 2.

Figures 16 and 17 are detail views of the detent mechanism for the reverser clutch control for each slide.

Figure 18 is a section on the line 18—18 of Figure 3.

Figure 19 is a diagrammatic view of a modified form of transmission to the saddle and knee.

Figure 20 is a plan view as on the line 20—20 of Figure 13 showing the control for the knee rate and direction clutches.

Figure 21 is a diagrammatic view showing the various positions of one of the rate and direction control levers.

Figure 1:
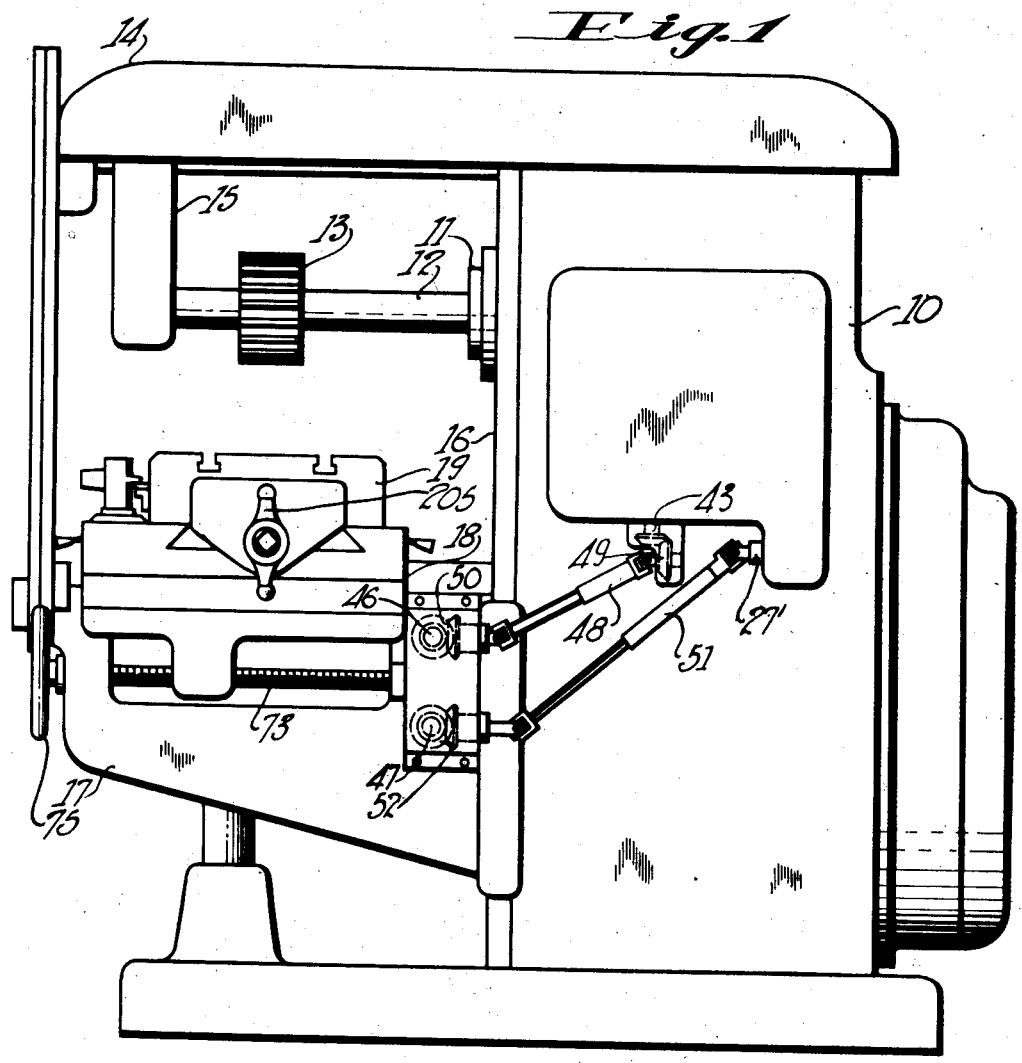
Figure 1 is an elevation of a machine tool embodying the principles of this invention.

The transmission and control mechanism forming the subject matter of this invention is best illustrated in connection with a knee and column type milling machine although it is equally adaptable to any type of milling machine having three movable supports, such as a bed type machine having a reciprocating work slide, and a spindle carrier movable in two different planes relative thereto, or the saddle type machine having a movable saddle carrying a reciprocating table in combination with a movable spindle carrier, as well as any of the other combinations of these elements whereby relative movement between the tool and work in three different planes is obtainable.

In the drawings the reference numeral 10 indicates the column of a milling machine having rotatably supported in the upper portion thereof a cutter spindle 11 for driving a cutter arbor 12 having a cutter 13 supported thereon. An overarm 14 is adjustably mounted on the top of the column and provided with a pendant 15 for journaling the outboard end of the cutter arbor. A work support organization is slidably mounted on guideways 16 formed on a vertical face of the column and comprises a knee 17, a saddle 18 slidably mounted on the knee for movement to and from the column and a table 19 reciprocably mounted on the saddle for movement transversely thereof.

The cutter spindle and the members of the work support organization are actuated by a prime mover, such as the motor 20, mounted in the base of the column which, through the belt 21, rotates a main drive shaft 22. The cutter spindle is adapted to be actuated from this shaft through suitable known variable speed transmission, not shown. The shaft 22, through gearing 23, drives the horizontal shaft 24 having fixed thereon the gears 25 and 26. The gear 25 serves as a rapid traverse actuator and drives the gear 27 secured to the end of the shaft 27' through an idler 25', as shown in Figure 15.

The gear 26 actuates a variable feed transmission comprising the shiftable gear couplets 28 and 29 slidably mounted on the shaft 30 which is driven from the gear 26 through the gear 31. These shiftable gears are adapted to impart four different rates of speed to the shaft 32 through gears 33, 34 and 35 keyed thereto which in turn, through the shiftable couplet 36 impart eight different rates of speed to the shaft 37. A second shiftable gear couplet 40 movable into mesh with either the gear 38 or 39 on shaft 37 is adapted to impart sixteen different speeds to the shaft 41 through intermediate gearing 42. This shaft drives a vertical shaft 43 through bevel gears 44 and 45.

Parallel shafts 46 and 47 are journaled in the knee transversely thereof. The shaft 46 is driven from the vertical shaft 43 in the column through the telescopic universal joint shaft 48 coupled at one end to the shaft 43 through bevel gearing 49 and at the other end with the shaft 46 through bevel gearing 50. The shaft 47 is driven from the rapid traverse driver 27 through the telescopic universal joint shaft 51 coupled at one end directly to the shaft 27' and at the other end to the shaft 47 through bevel gearing 52.

Figure 3:
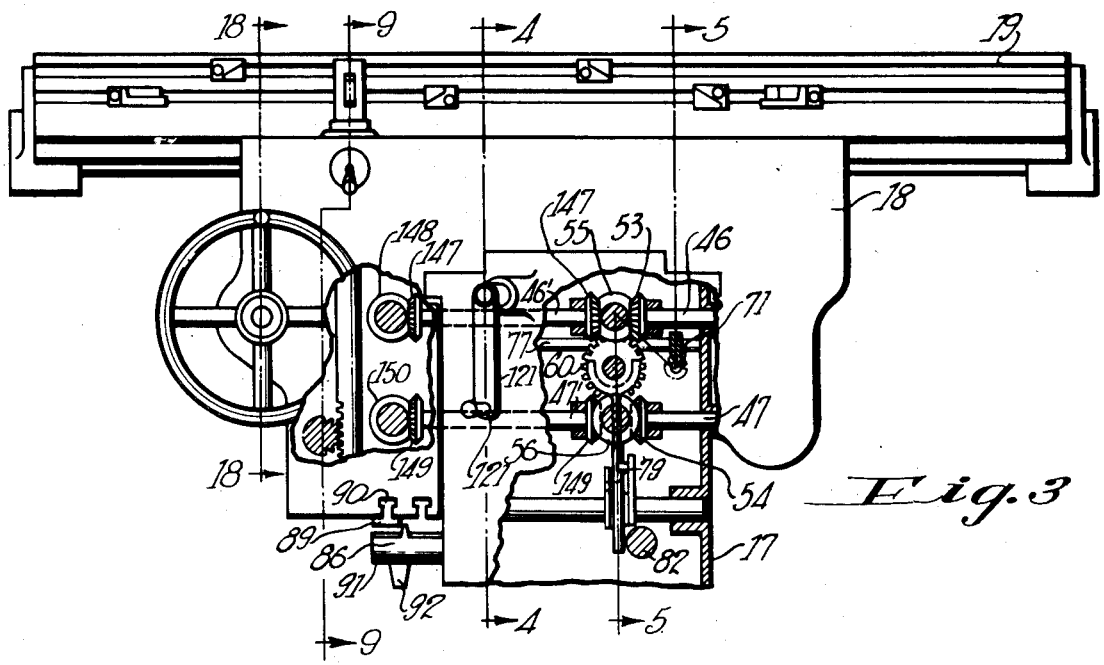
Figure 3 is a front view of the knee, partly in section, showing the transmission to the supports.

As more particularly shown in Figure 3 the feed shaft 46 and the rapid traverse shaft 47 extend transversely of the knee and terminate in bevel gears 53 and 54 meshing with bevel gears 55 and 56 respectively, secured to the end of shafts 57 and 58. These shafts which constitute branch transmissions serve to actuate the knee at feed or rapid traverse rates, the shaft 57 being actuated from the variable feed transmission in the column and the shaft 58 being driven at rapid traverse.

The transmission to the saddle is shown more particularly in expanded view in Figure 5. Bevel gear 55 has integrally formed therewith the pinion 59 meshing with the clutch gear 60. The bevel gear 56 also has a pinion gear 61 integral therewith meshing with the clutch gear 62. Attention is invited to the fact that the ratio of each pinion gear to the clutch gear is two to three.

The clutch gears 60 and 62 are mounted for free rotation on the shaft 63 which has a clutch member 64 splined thereon and shiftable into engagement with either of the clutch gears for driving the bevel gear 65 secured to the end of the shaft at either a feed or rapid traverse rate. This bevel gear drives a reverser through the bevel gear 66 which is in the ratio of two to one to gear 65. Gear 66 is secured to one end of the shaft 67 which has a miter gear 68 at the other end for rotating a pair of miter gears 69 and 70 in opposite directions. These gears are mounted for free rotation on the end of the saddle feed screw shaft 71 and a clutch member 72 splined on the shaft is interposed therebetween having clutch teeth on opposite faces thereof for engagement with the clutch teeth formed on the gears 69 and 70. The shaft 71 is journaled in the knee and has a threaded portion 73 for receiving the nut 74 integral with the saddle 18 for effecting translation thereof. The saddle may be selectively actuated at feed or rapid traverse through the rate control clutch 64 and selectively moved toward or from the column of the machine by means of the direction control clutch 72. The saddle may also be manually translated either from the front or from the rear of the machine, the shaft 71 extending through the forward wall of the knee and provided with a hand wheel 75 which may be detachably connected to the shaft; and from the rear by a hand crank which may be detachably connected to the squared end 77' (Figure 9) of shaft 77 which is operatively connected to the shaft 71 through spiral gearing 78.

Figure 23:
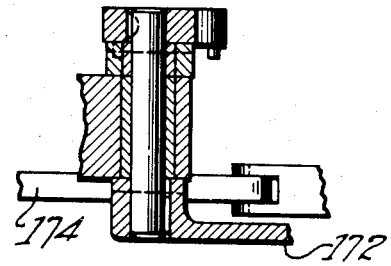
Figure 23 is a detail section on the line 23—23 of Figure 22.

A common rate and direction control has been provided for the clutches 64 and 72 which may be either dog or manually actuated. Accordingly, the rate clutch 64 has a shifter fork 79, shown more particularly in Figure 8, mounted for free rotation on the stub shaft 79'. A bell crank 80, comprising the arms 80' and 80'' keyed or otherwise secured to the shaft 79' for rotation therewith, similar to that shown in Figure 23, is provided for shifting the fork and has a bifurcated end embracing a pin 81 integral with the shifter rod 82, while the arm 80'' is provided with a forked end in the form of two pins 207—207 embracing the arm 79 but with a predetermined amount of lost motion. A detent 208 is provided on the hub of the member 80' for engaging indents in the lever 209 held in engagement with the detent by a spring 210. This mechanism acts as a load and fire device. Upon rotation of the shaft 82 to cause downward movement of the arm 80' and thereby movement of the clutch 64 to a feed position, by means of the pin 81, the detent 208 forces the lever 209 upward against the action of the spring 210 while simultaneously one of the pins 207 moves toward the arm 79 to take up the lost motion. When the detent passes the peak between the indents on the lever, the spring 210 comes into action to snap the clutch 64 to its new position, thus insuring that the shift will be made without interrupting the motion of the moving parts. The rate control shifter rod 82 is provided with gear teeth 87 meshing with the circular rack teeth 88 formed on the plunger 86 for operation thereby.

The reverser clutch 72 is also provided with a shifter comprising the bell crank 83 (Figures 5 and 7) having a fork at the end of one arm embracing the spool of the clutch 72 and a fork 84 at the end of the other arm embracing an eccentric portion on the rotatable and reciprocable plunger 86 which serves as a common control for the rate and direction clutches. This eccentric portion comprises two cams 211 and 212 integrally formed on the disk 213 keyed or otherwise secured to the plunger 86. The cam portion 211 is of sufficient diameter to fit the forked end of the lever 83 without lost motion while the cam 212 is made smaller to give a predetermined amount of lost motion between the cam and lever. Detent mechanism is provided for the plunger comprising a serrated plate 181 (Figures 16 and 17) having three indents for locking the cam 211 and connected clutch 72 in any one of three positions and the serrated plate 182 having two indents for locking the clutch in either of two positions.

A single detent 183 is provided for both plates, engaging plate 181 when the plunger is moved inward to position the cam 211 in the fork 84, and engaging plate 182 when the plunger is moved outward to position cam 212 in the fork 84. Accordingly, when the shifter fork is in engagement with the cam 211 the clutch may be moved to and detained in a neutral position, as well as in its two driving positions, but when in engagement with the cam 212 it may only be locked in either a forward or reverse driving position.

The plunger 86 projects through the side wall of the knee and is adapted to be actuated by dogs, such as 89 (Figure 3) secured to the saddle by bolts mounted in T-slots 90 which are formed on the under side of the saddle and extend parallel to the side wall of the knee. The head 91 is provided with a wing portion 92 for dog rotation to effect change in direction and projections 93 and 94 for cooperating with properly formed dogs, which are more particularly shown in copending application Serial Number 431,909, filed Feb. 27, 1930, to effect reciprocation of the plunger and thus effect a change in rate of movement of the saddle.

From the foregoing it should be apparent that when the plunger 86 is moved inward, the rate clutch is moved to a feed position through rack 88, gear 87, shifter rod 82 and bell crank 80 while at the same time, the cam 211 is moved into engagement with the fork 84. The plunger may now be rotated to cause movement of the clutch 72 from a neutral position, for instance, to either of its motion transmitting positions effecting movement of the saddle in or out with respect to the column. By means of dogs, previously referred to, the clutch may be automatically returned to neutral position to stop movement of the saddle.

Outward movement of the plunger 86 shifts the clutch 64 to its rapid traverse position, and moves the cam 212 into engagement with the fork 84. This outward movement of the plunger can only take place when the reversing clutch is in a motion transmitting position due to interference between the finger 183' of the detent and the peak 182' of the plate 182 when the parts are in a neutral position. Dog rotation of the plunger 86 will now effect a complete reversal in the saddle movement due to the load and fire mechanism comprising the cam 212 having a lost motion fit in the fork 84 and the plate 182 with its spring actuated detent 183.

The plunger 86 may also be manually controlled from the rate and direction control lever 95, as shown in Figure 6, located at the rear of the knee or from a similar control lever 96 located at the front of the knee. As shown in Figure 14, each lever is universally mounted in a ball and socket joint 97 and provided on the interior end thereof with a rounded head 98 fitting in a socket 99 of a radial projection formed on a collar 100 one of which is secured to each end of the shaft 101. This shaft is provided intermediate the length thereof with circular rack teeth 102 meshing with gear teeth 103 formed on the plunger 86 for effecting rotation thereof upon longitudinal movement of the shaft by either control handle 95 or 96. The shaft 101 is further provided with a gear 104 for imparting rotational movement to the shaft 82 through idlers 105 and a gear 106 secured to the end of the shaft 82. This provides simple means for operating both the rate and direction clutches from a single handle, vertical movement of which will effect a change in rate while horizontal movement will effect a change in direction, it being noted that the handles 95 or 96 are arranged for directional control, that is, movement of the handle toward the column will cause movement of the saddle toward the column and vice versa, and also have a neutral position for disconnecting all power to the saddle.

Figure 4:
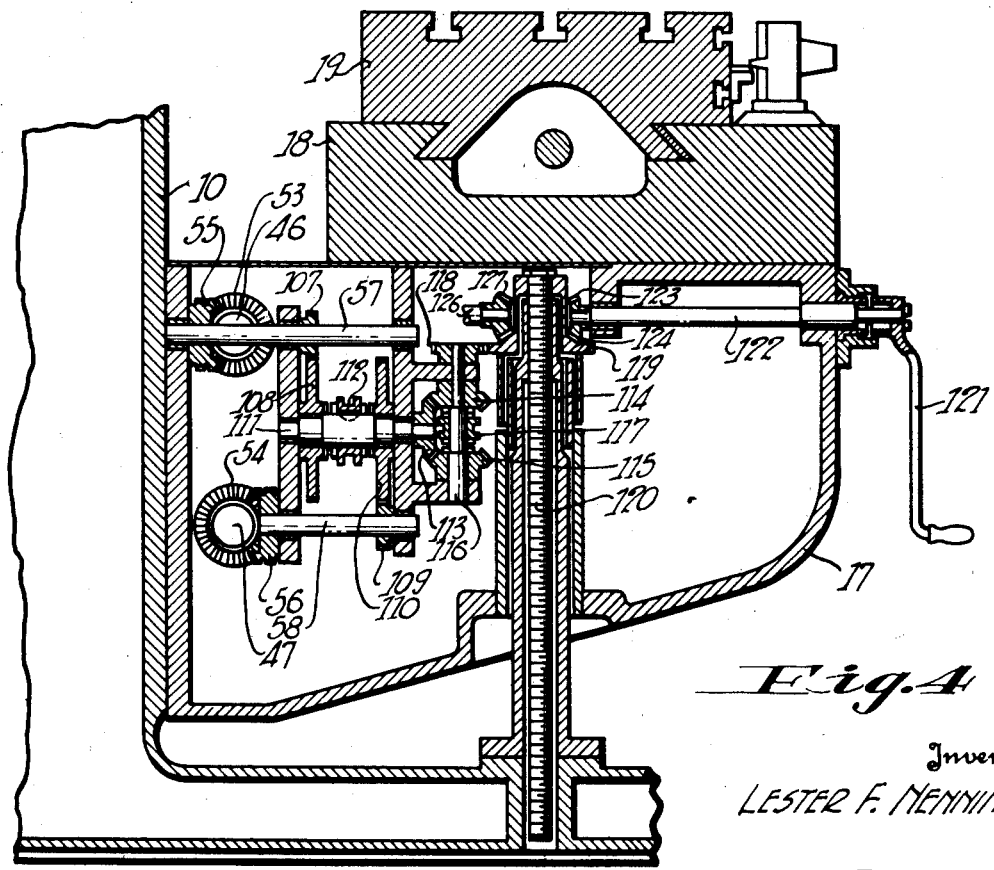
Figure 4 is a vertical section through the knee as on the line 4—4 of Figure 3 showing an expanded view of the transmission to the knee.

The feed and rapid traverse transmission to the knee will now be described. As more particularly shown in the expanded view in Figure 4, the branch transmission feed shaft 57 is provided with a fixed pinion 107 meshing with the clutch gear 108 while the rapid traverse shaft 58 is provided with a pinion 109 meshing with the clutch gear 110. Attention is invited to the fact that the ratio of the pinion 107 to its driving gear 108, as well as the ratio of the pinion 109 to the gear 110, is in the proportion of one to three. Clutch gears 108 and 110 are mounted for free rotation upon the horizontal shaft 111 having the rate control clutch 112 splined thereon intermediate the clutch gears and shiftable into engagement with either for driving the miter gear 113 secured to the end of the shaft 111 at either a feed or rapid traverse rate. This gear meshes with miter gears 114 and 115 mounted for free rotation on the shaft 116 and provided with clutch teeth upon their opposite faces for selective engagement with the shiftable direction control clutch 117 splined to the shaft 116. A pinion 118 secured to the end of the shaft 116 meshes in the ratio of one to two with the spur gear 119 secured to the end of the knee elevating screw 120.

The clutch 112 serves as a rate control clutch while the clutch 117 is a direction control or reversing clutch but it should be noted that this clutch also has a neutral position whereby all power may be disconnected from the knee. With the clutch 117 in neutral, the knee may be manually adjusted by the front control lever 121 which is adapted to be detachably connected to the shaft 122 having a bevel gear 123 on the end thereof meshing with bevel gear 124 formed integrally with the spur gear 119. A rear manual control is also provided comprising the shaft 126 having a bevel gear 127 on the interior end thereof meshing with the bevel gear 124 and having a squared portion 125 at its other end for receiving a hand crank. The knee may thus be power actuated at feed or rapid traverse and in either direction, as well as manually adjusted from either the front or the rear of the machine.

Figure 10:
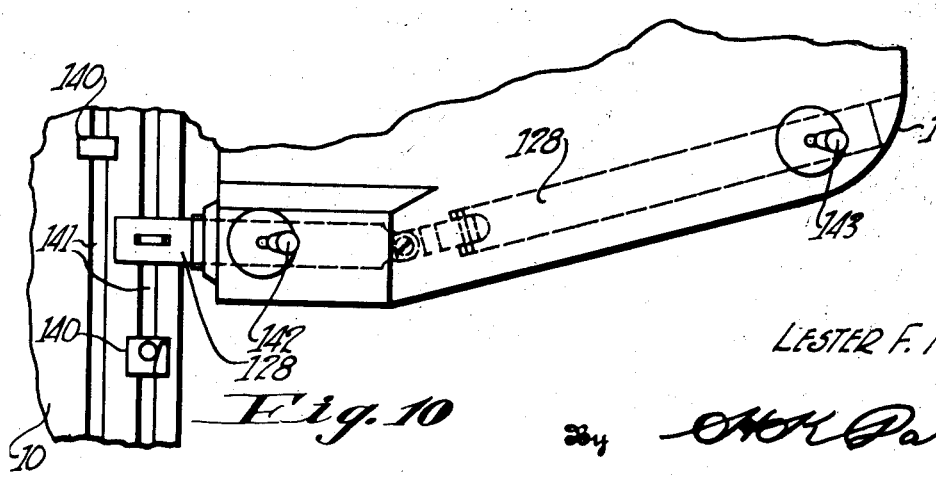
Figure 10 is a detail view showing the knee controls on the side thereof.

The rate and direction clutches 112 and 117 are adapted to be controlled from a common control plunger 128 journaled in the lower part of the knee, as shown in Figures 10, 13 and 20. The rate control clutch 112 is provided with a pivoted shifter fork 129 having a rounded end 130 fitting in a recess 131 of the pivoted shifter rod 132.

Figure 25:
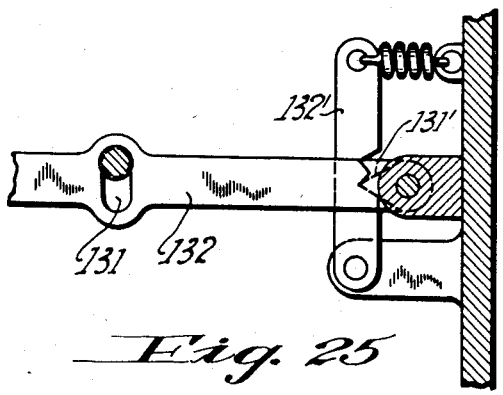
Figure 25 is a detail on the line 25—25 of Figure 13.

A predetermined amount of lost motion is provided between the rounded head 130 and its slot 131 which in combination with the detent 131' and the spring actuated pawl 132', shown more particularly in Figure 25, serves as a load and fire trip mechanism to insure completion of clutch movement from one position to the other.

The clutch 117 has a shifter fork 133 secured to the end of an oscillatable shaft 134 journaled in the side of the knee and having an arm 135 secured to the other end. A shifter rod 136 is pivotally connected at one end to the arm 135 and at the other end to the rock arm 137. The rock arm is pivoted to a fixed part of the knee and provided with a bifurcated end 138 embracing a projection formed integral with the plunger 128.

This projection comprises another pair of cams 211 and 212, previously referred to and described in connection with the saddle, which serve in a similar manner in combination with a detent mechanism similar to that shown in Figures 16 and 17 and indicated generally at 207 in Figure 20, to effect complete reversal of the clutch when the cam 212 is positioned in the fork or partial movement of the clutch to or from a neutral position when the cam 211 engages the fork.

The shifter rod 132 is connected with the plunger 128 by a groove connection whereby longitudinal movement of the plunger will shift the clutch 112 while rotational movement will shift the clutch 117 without disturbing the clutch 112.

The control plunger 128 is adapted to be dog actuated in a manner similar to plunger 91 and as shown in Figure 10, dogs 140 are mounted in T-slots 141 formed on the column for this purpose. The plunger is also adapted to be manually actuated from control lever 142 located at the rear of the knee or 143 located at the front of the knee. As shown in Figure 13, these levers are mounted for universal movement in ball and socket joints, such as 144, and have an interior ball shaped end 145 for engaging a radial slot 146 in the plunger 128. These levers are arranged for directional control, vertical movement up or down effecting movement of the knee up or down and lateral movement controlling the rate.

The transmission to the table will now be described. The feed shaft 46 and the rapid traverse shaft 47 are continued laterally of the knee, as shown at 46' and 47' in Figure 3, the shaft 46' having miter gears 147 secured to opposite ends and meshing with miter gear 55 and miter gear 148 respectively, while the shaft 47' has similar miter gears 149 attached to opposite ends and meshing respectively with miter gear 56 and miter gear 150. As more particularly shown in Figure 9, miter gears 148 and 150 are secured to the end of spline shafts 151 and 152 respectively, which are journaled in the knee against longitudinal movement and pass through a depending portion of the saddle to drive respectively, the spur gears 153 and 154 splined thereon but fixed for movement with the saddle.

A shaft 155 is rotatably mounted in the saddle and has mounted thereon for free rotation a pair of clutch gears 156 and 157, the gear 156 being driven from the feed gear 153 while the gear 157 is driven from the rapid traverse gear 154. Attention is invited to the fact that the ratio of the gear 153 to the gear 156, as well as the ratio of the gear 154 to the gear 157 is one to one.

A rate clutch 158 is splined on the shaft 155 and shiftable into engagement with either the clutch gear 155 or the clutch gear 157 to drive the bevel gear 159 secured to the end thereof at either a feed or rapid traverse rate, engagement with the gear 156 effecting a feed rate and engagement with the gear 157 effecting a rapid traverse rate.

Figure 24:
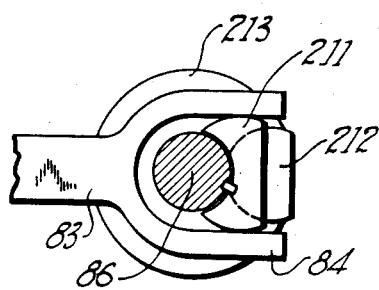
Figure 24 is a detail of the shifting cams for the direction control clutches.

A vertical shaft 160 is journaled in the saddle and has a bevel gear 161 secured to the lower end thereof in driving engagement with bevel gear 159 in the ratio of two to one and has secured to the upper end a miter gear 162 meshing with a pair of opposed miter gears 163 mounted for free rotation on sleeves surrounding lead screw 164. The miter gears 163 are provided with clutch teeth on their adjacent faces and a reverser clutch 165 is splined on the lead screw and is shiftable into engagement with the clutch teeth of either miter gear by means of a pivoted shifter fork 166 having a forked end 167 embracing the depending projection 168 of the collar 169 secured to the plunger 170. This projection comprises a pair of cams 211 and 212, as shown in Figure 24 and previously described in connection with the saddle. This plunger is rotatably and reciprocably mounted in the saddle, reciprocating movement effecting a rate selection and an oscillatory movement effecting a change in direction, the plunger also having a neutral position in which the table is at rest.

Figure 22:
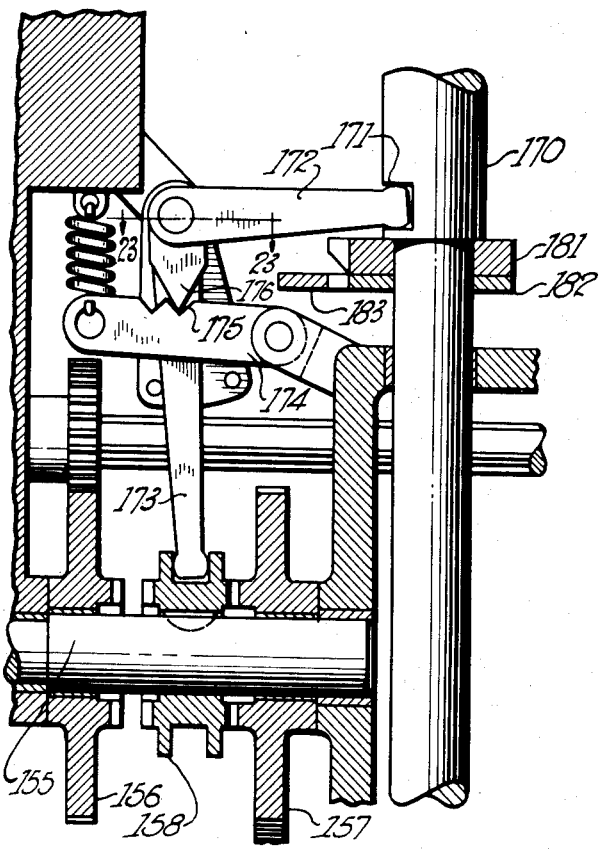
Figure 22 is a detail of a load and fire trip mechanism for the rate control clutches.

As shown in Figure 22, the plunger is further provided with an indent 171 for receiving the rounded head of the bell crank 172 having a forked end 173 engaging the rate control clutch 158. The bell crank is provided with detent mechanism comprising the pivoted latch member 174 having notches 175 for receiving the detent 176. Movement of the plunger up will cause the clutch 158 to engage with the clutch gear 157 and thereby move the table at rapid traverse while movement of the plunger downward will effect engagement between the clutch member 158 and the clutch gear 156 thereby causing movement of the table at a feed rate. While the plunger is in either an upward or a downward position it may be oscillated to effect movement of the table either forward or return by means of the cams 211 or 212 secured thereto and engaging the reverser shifter fork 166 and when in a downward position it may also be moved to a neutral position to stop the table.

The plunger may be moved to any one of its five positions by means of the manual control lever 177 pivotally mounted in a ball and socket joint, as shown at 178, and which has a ball shaped end 179 engaging a groove 180 formed in the collar 169.

As shown in Figures 16 and 17, the plunger 170 is provided with a pair of detent plates 181 and 182 which are keyed to the plunger for simultaneous movement therewith and are provided with a common latch member or detent 183 pivotally mounted to a fixed part of the saddle and held into engagement with the plates by means of spring 134. When the plunger is in a lowered position the detent engages plate 181 and it will be noted three station notches are provided on the plate, the middle one corresponding to stop position of the lever and the outside ones corresponding to a feed forward and a feed return position, see Figure 21.

These plates are mounted face to face together on the plunger rod with the outside station notches in vertical alignment and from this it will be seen that when the plunger is in neutral or stop position, it is incapable of vertical movement. It is, therefore, necessary to select the direction of movement first by moving the control lever right or left which will effect movement of the table right or left, after which the lever may be moved vertically to increase the feed rate to rapid traverse. The detent 183 is now in engagement with the plate 182. Movement of the control lever right or left in this upper position changes the direction of movement only.

If so desired, the rate and direction lever may have a sixth position, as indicated by the dotted circle in Figure 21 in which case the plate 182 will be replaced by a plate of the same form as 181, and this will make it possible to move directly from a rapid traverse position to a stop position without the necessity of moving the lever through a feed position.

The plunger 170 is also adapted to be controlled on the column side of the table by means of the operating handle 184 which is mounted similarly to the handle 177 and connected to an auxiliary plunger rod 185 having rack teeth 186 formed on the end thereof meshing with pinion teeth 187 of the rotatable shaft 188 which has pinion teeth 189 formed on the opposite end thereof meshing with rack teeth 190 formed on the end of the plunger 170. The rear plunger 185 also has secured to the extreme end thereof a crank 191 pivotally connected to the link 192 which is operatively connected with the crank 193 secured to the end of the plunger 170. It will be noted that the link 192 is connected to opposite sides of the plungers 185 and 170 whereby rotation of the plunger 185 in a clockwise direction will effect rotation of the plunger 170 in a counter clockwise direction. This makes it possible to obtain directional control of the table from either the front or the rear of the machine. The plunger is also adapted to be dog actuated in a manner similar to the plungers for the saddle and knee and for this purpose dogs, such as 203, may be carried by the table.

The table may also be manually reciprocated from the front or rear of the machine by means of hand wheels 194 and 194'. The hand wheel 194 is adapted to be detachably connected to the stud shaft 201 having a spur gear 202 thereon meshing with the gear 197 secured to the shaft 198 journaled in the front and rear walls of the saddle. This shaft has a helical gear 195 meshing with a helical gear 196 splined on the lead screw 164. The hand wheel 194' is adapted to be detachably connected direct to the rear end of shaft 198, thereby making it possible to manually adjust the table from either the front or rear of the machine. If so desired, the lead screw may be provided with a detachable operating handle 205 on each end whereby the table may be manually adjusted from any one of its four sides.

A modification of the invention is shown in Figure 19 in which the saddle and knee are driven from a common rate selector clutch 64 and the shaft 111 is driven from the shaft 63 by spur gears 199 and 200. These gears are in the ratio of one to two. In such a case separate controls would be provided for these clutches, such as a rate selector control for the clutch 64 and separate direction controls for the clutch 72 of the saddle and the clutch 117 of the knee.

From the foregoing description it should now be apparent that an improved transmission and control mechanism for machine tools has been provided which is particularly adaptable to machines having a multiplicity of movable slides, in that each slide may now be set-up for a given cyclic movement, involving different rates and directions, independently of the other slides and without disturbing their set-up, while in addition, two or more slides may be actuated at the same time for effecting a compound movement of the work. If applied to a knee and column type machine wherein the slides are mounted successively one upon the other, the uppermost slide becomes the lightest to move, while each succeeding one increases in weight due to the added load of the preceding slide or slides, requiring a greater moving force, and for this reason the slide branch transmissions are permanently coupled to the main transmission in such ratios that for a given speed of actuation of the main transmission each successive slide will be moved at a progressively slower rate to the end that the power necessary to move any slide from a given rate of the main transmission approaches a constant eliminating the possibility of abnormal starting torques with resultant strain on the parts.

The improved control mechanism makes it possible for the reversing clutch of each support to be dog-actuated to a neutral position permitting automatic one-way cyclic movement thereof in addition to the automatic reciprocating cyclic movements. It will also be evident that the power actuation of each support is under the control of dual manual rate and direction control levers located at different operating stations spaced about the machine, the levers being of the directional control type whereby the operator merely selects the lever corresponding to the support to be actuated and then moves the lever in the direction of movement desired. The provision of dual control means for manually effecting translation of the knee and saddle from different operating stations and the manual means for effecting translation of the table from a position at any one of its four sides adds to the flexibility and ease of operation of a multiple slide machine tool organization in which any slide may be power actuated through a complete range of feed and rapid traverse movements.

That which is claimed is:

1. A milling machine having a column and a plurality of movable supports thereon, a transmission and control mechanism therefor including a prime mover, a main feed transmission line and a main rapid traverse transmission line actuated thereby and extending in parallel relation, a branch transmission for each of said supports including a feed line and a rapid traverse line continuously actuated from the respective main lines, an individual rate selector clutch for each support shiftable to couple the terminus of either line of the branch transmission with its respective support for actuation thereby, and a reverser associated with each selector for determining the direction of movement thereof.

2. A milling machine having a column, a saddle, table and knee carried thereby, a transmission therefor comprising a prime mover mounted in the column, a rapid traverse transmission constantly driven by the prime mover and extending to the knee, a variable feed transmission constantly driven from the prime mover and extending to the knee including a feed change box mounted in the column, individual rate and direction selector clutches coupled with each of said supports, independent means for connecting each of said selector clutches with the feed and rapid traverse transmissions whereby upon simultaneous actuation of all of the supports the rate and direction of movement of each may be independently determined.

3. A milling machine having a support, a slidable table thereon, power actuated feed and rapid traverse main transmission lines, independent branch lines couplable with either of said main transmission lines for actuating the table, means to disconnect all power from the table, manual means operable during said disconnection for manually translating the table from either end thereof, and a second manual translating means carried by the table support and operable from either the front or rear of the table whereby the table may be manually adjusted from any side thereof.

4. A milling machine having a column, a knee vertically movable on the column, a saddle transversely movable on the knee, a table reciprocably mounted on the saddle, a transmission and control mechanism for imparting movement to the various supports including a prime mover, a main feed transmission line and a main quick traverse line coupled to the prime mover for actuation thereby, individual branch transmissions extending to each support, each branch transmission comprising a feed line and a rapid traverse line connected to the respective main lines for continuous actuation thereby, a final feed screw for each support, individual rate selectors for coupling either line of their respective branch transmission to the respective support feed screw, a direction determinator interposed between each selector clutch and its respective fed screw and single control levers individual to each support for determining the rate and direction of movement thereof.

5. A milling machine having a column, a cutter spindle journaled in the column, a work support, a knee vertically movable on the column for adjusting said work support vertically toward and from the axis of said cutter spindle, a saddle slidably mounted on the knee toward and from the column for adjusting the work support parallel to the axis of the cutter spindle, power means for effecting each of said adjustments including a feed shaft and a quick traverse shaft journaled in the knee, a saddle feed screw, a rate selector clutch for coupling either shaft to the saddle feed screw, a knee feed screw, a rate selector clutch for coupling either shaft to the knee feed screw, individual reversers interposed between each feed screw and its respective selector clutch and a single control lever coupled to the selector clutch and reverser for the knee for determining its rate and direction of movement and an additional single control lever coupled to the selector clutch and reverser for the saddle for determining the rate and direction of power adjustment of the table parallel to the axis of the cutter spindle.

6. A milling machine having a column, a cutter spindle journaled in the column, a work support mounted on the column for movement in three paths relative to the cutter spindle, power driven means for feeding the work support in each of said paths including a main feed shaft adapted to be driven at variable predetermined feed rates, branch lines individual to each path for effecting movement of the work support in the respective path, each branch line having an initial drive shaft, means to couple the initial drive shaft of one branch line to the feed shaft for rotation thereby at the same rate as the feed shaft to effect movement of the work support transversely of the cutter axis, means to couple the initial drive shaft of a second branch line to the feed shaft for rotation at a slower rate than the feed shaft to move the work support parallel to the axis of the cutter spindle, and additional means coupling the initial drive shaft of a third branch line to the feed shaft for rotation at a slower rate than the second branch line to effect movement of the work support vertically toward and from the cutter spindle, and separate control levers for determining movement of the work support in each of said three paths.

7. A milling machine having a column, a cutter spindle journaled in the column, a work support mounted on the column for movement in three paths relative to the cutter spindle, power driven means for feeding the work support in each of said paths of movement, additional power driven means for effecting quick traverse movement in each of said paths comprising a main quick traverse shaft, branch lines individual to each path for effecting quick traverse movement therein, each branch line having an initial drive shaft, means to couple the initial drive shaft of one branch line to said main shaft for rotation at the same rate as the main shaft to effect movement of the work support transversely of the cutter axis, means to couple the initial drive shaft of a second branch transmission to said main shaft for rotation at a slower rate than the main shaft to move the work support parallel to the axis of the cutter spindle, and additional means for coupling the initial drive shaft of a third branch transmission to said main shaft for rotation at a slower rate than the second branch transmission to effect movement of the work support vertically toward and from the cutter spindle, and separate control levers for determining quick traverse movement of the work support in each of said paths.

8. A milling machine having a column, a vertical guide face formed on one side of the column, a knee reciprocably mounted on said guide face, a saddle movable transversely of the knee toward and from the column, a table reciprocably mounted on the saddle for movement transversely thereof, power means for effecting movement of the members relative to each other and to the column including a pair of transverse parallel shafts journaled in the knee parallel to the face of the column, power means in the column for effecting rotation of one of said shafts at a predetermined variable feed rate and the other at a constant quick traverse rate, a plurality of branch transmission shafts journaled in the knee at right angles to the feed shaft, a plurality of branch transmission shafts journaled in the knee at right angles to the rapid traverse shaft, individual means for selectively coupling a branch feed shaft and a branch rapid traverse shaft to each support for effecting actuation thereof, and a reverser interposed between each selector means and its respective support for determining the direction of movement thereof.

9. A milling machine having a column, a knee mounted on the column for vertical movement, a saddle mounted on the knee for transverse movement, and a table reciprocably mounted upon the saddle, a prime mover, a plurality of main line transmissions one of which is actuated by the prime mover at a constant rapid rate and the other at a predetermined variable feed rate, individual transmission trains extending respectively to the table, saddle and knee, a rate selector at one terminus of each train, a plurality of pairs of parallel transmissions branching from the main line transmissions, each pair terminating in opposed relation to a rate selector, gearing for coupling one pair to the respective main lines in one-to-one ratio, additional gearing coupling the other pairs to the respective main lines for actuation of the remaining branch transmissions at progressively decreasing rates relative to the first branch transmission, a direction determinator for coupling the first train to the table, and additional rate determinators for coupling the other trains respectively to the saddle and knee whereby for a given rotation of the main line shaft the table, saddle and knee will move at progressively decreasing rates.

10. A milling machine having a plurality of movable supports, a transmission and control mechanism therefor including a prime mover, a main variable feed transmission, a main rapid traverse transmission, said transmissions extending in parallel relation from the prime mover, a branch transmission for each movable support comprising a feed line and a rapid traverse line operatively coupled to the respective main line transmissions in different ratios, a single train terminating in a reverser at one end and a rate selector at the other end, said rate selector being interposed between the branch feed line and the branch rapid traverse line for selective engagement therewith, and individual control means associated with each support for jointly controlling the individual rate and direction determining means therefore.

11. A milling machine having a column, a cutter spindle and a work table supported by the column for relative movement in three different paths, power driven means for effecting a relative feed movement between the spindle and work table in each of said paths including a main feed shaft adapted to be driven at variable predetermined feed rates, branch lines individual to each path of movement and selectively operable for effecting movement in the respective paths, each branch line including an initial drive shaft, means coupling the drive shaft of one branch line to the main shaft for equal angular rotation therewith to effect relative movement between the work table and cutter spindle along one path, means coupling the initial drive shaft of a second branch line to the feed shaft for rotation at a slower rate than the main feed shaft to effect relative movement between the work support and cutter spindle along a second path, and additional means coupling the initial drive shaft of a third branch line to the main feed shaft for rotation of a slower rate than said second branch line to effect relative movement between the work support and cutter spindle along a third path and separate control levers for determining relative movement between the work support and cutter spindle along each of said three paths.

12. A milling machine having a column, a cutter spindle and a work table supported by the column for relative movement along three different paths, power driven means for effecting a relative feed movement along any of said paths, additional power driven means for effecting a quick traverse movement along any of said paths comprising a main quick traverse shaft, branch lines individual to each path for effecting quick traverse movement therein, each branch line having an initial drive shaft, means to couple the initial drive shaft of one branch line to said main shaft for equal angular rotation therewith to effect relative movement between the works support and cutter spindle along one path, means to couple the initial drive shaft of a second branch transmission to said main shaft for rotation at a slower rate than the main shaft to effect relative movement between the work support and cutter spindle along a second path at right angles to the first named path, and additional means for coupling the initial drive shaft of a third branch transmission to said main shaft for rotation at a slower rate than the second branch transmission to effect relative movement between the work support and cutter spindle along a third path, and separate control levers for determining quick traverse movement between the work support and cutter spindle in each of said paths.

13. A milling machine having a cutter, a work support, means for effecting relative movement between the cutter and the work support in three different transverse paths or directions either singly or simultaneously including a first branch transmission for effecting relative movement in one of said paths comprising a single transmission train terminating at one end in a rate selector and at the other end in a direction determinator, a second branch transmission for effecting relative movement in a second path comprising a single transmission train terminating at one end in the rate selector and the other end in a direction determinator, a third branch transmission for effecting relative movement in a third direction comprising a single transmission train terminating at one end in a rate selector and at the other end in a direction determinator, a power actuated main feed line and quick traverse line selectively connectible to the branches by said rate selectors, individual trip plungers associated with each branch transmission for selectively controlling the respective rate and direction determinators thereof, each of said trip plungers being mounted for directional control relative to the respective path controlled, mechanisms connecting the trip plungers to the respective parts controlled thereby, whereby any plunger may be automatically tripped to a neutral position to stop movement in the respective path, or tripped to effect automatic reversal in the direction of movement in said path, or automatically actuated to change the rate of movement in the respective paths, and dual manual control means associated with each plunger for actuation thereof from different operating stations.

14. A milling machine having a column, a cutter spindle journaled in the column, a work support organization mounted on the column for relative movement in three directions relative to the cutter spindle comprising a knee vertically movable on the column toward and from the cutter spindle, a saddle reciprocably mounted on the knee for movement parallel to the axis of the cutter spindle, a table reciprocably mounted on the saddle for movement transversely of the cutter spindle, means for effecting power movement of the various supports in their respective paths either singly or simultaneously including a first branch transmission for effecting relative movement between the knee and the cutter spindle comprising a single transmission train terminating at one end in a rate selector and in the other end in a direction determinator, a second branch transmission for effecting relative movement between the saddle and the cutter spindle comprising a single transmission train terminating at one end in a rate selector and at the other end in a direction determinator, a third branch transmission for effecting relative movement of the table transversely of the cutter spindle comprising a single transmission train terminating at one end in a rate selector and at the other end in a direction determinator, individual trip plungers associated with each transmission for selectively controlling the respective rate and direction determinators thereof, each of said trip plungers being mounted for directional control relative to the respective path, mechanisms connecting the trip plungers to the respective parts controlled thereby whereby any plunger may be automatically tripped to position the direction determinator in neutral to stop movement in the controlled path, or automatically tripped to effect reversal in the direction of movement along the controlled path or automatically move to change the rate of movement along the respective paths, and dual control means associated with each plunger for manual actuation thereof from different operating stations.

15. A milling machine having a support, a slide reciprocably mounted on the support, transmission means for moving the slide at feed or rapid traverse rates including a rate determining clutch, a direction determining clutch, a single control plunger for said clutches for selective operation of said plunger having a laterally projecting control member, means to move the member in either direction to determine movement of said support in a corresponding direction, an additional control plunger at the opposite side of the slide having a laterally projecting control portion, and means connecting the second plunger to the first in such a manner that the second control portion is direction in effect whereby the slide may be directionally controlled from opposite sides thereof.

LESTER F. NENNINGER.